US012200528B2

(12) United States Patent
Eriksson et al.

(10) Patent No.: US 12,200,528 B2
(45) Date of Patent: Jan. 14, 2025

(54) TECHNIQUE FOR COMMUNICATING A RADIO QUALITY REPORT

(71) Applicant: Telefonaktiebolaget LM Ericsson (publ), Stockholm (SE)

(72) Inventors: Erik Eriksson, Linköping (SE); Jonas Pettersson, Luleå (SE); Richard Tano, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 463 days.

(21) Appl. No.: 17/600,540

(22) PCT Filed: Apr. 3, 2019

(86) PCT No.: PCT/EP2019/058425
§ 371 (c)(1),
(2) Date: Sep. 30, 2021

(87) PCT Pub. No.: WO2020/200446
PCT Pub. Date: Oct. 8, 2020

(65) Prior Publication Data
US 2022/0182869 A1   Jun. 9, 2022

(51) Int. Cl.
*H04W 24/10*   (2009.01)
*H04W 28/02*   (2009.01)
(Continued)

(52) U.S. Cl.
CPC ....... *H04W 24/10* (2013.01); *H04W 28/0236* (2013.01); *H04W 76/15* (2018.02); *H04W 76/20* (2018.02)

(58) Field of Classification Search
CPC ... H04W 24/10; H04W 72/542; H04W 76/19; H04W 76/15; H04W 76/20; H04W 88/06;
(Continued)

(56) References Cited

U.S. PATENT DOCUMENTS

2015/0223178 A1   8/2015   Pietraski et al.
2016/0337916 A1   11/2016  Deenoo et al.
(Continued)

OTHER PUBLICATIONS

"Remaining details on beam recovery", 3GPP TSG RAN WG1 Meeting AH 1801, R1-1800111, Vancouver, Canada, Jan. 22-26, 2018, pp. 1-7.
(Continued)

*Primary Examiner* — Quoc Thai N Vu
(74) *Attorney, Agent, or Firm* — Sage Patent Group

(57) ABSTRACT

A technique for receiving (306) a radio quality report over a secondary connection, which is different from the primary connection between a first device and a second device, to which the radio quality report relates, is described. As to a method aspect of the technique, a transmission (302), to the second device, of a control message indicative of configuring the second device with reporting a radio quality report over a secondary connection that is different from a primary connection between the first device and the second device is performed. A transmission (304), to the second device over the primary connection, of at least one reference signal, RS, is subsequently performed, followed by a reception (306), from the second device over the secondary connection, of the radio quality report that is indicative of a radio quality of the primary connection based on the at least one RS. Hereinafter, a transmission (308), based on the radio quality report, is performed of at least one of a second control message and data from the first device over the primary connection to the second device.

18 Claims, 9 Drawing Sheets

(51) Int. Cl.
*H04W 76/15* (2018.01)
*H04W 76/20* (2018.01)

(58) Field of Classification Search
CPC ..... H04W 16/28; H04W 24/02; H04W 36/30; H04W 88/04; H04W 24/04; H04W 36/0069; H04W 28/0236; H04B 7/0632; H04B 7/0617; H04B 7/088
See application file for complete search history.

(56) References Cited

U.S. PATENT DOCUMENTS

| | | | | |
|---|---|---|---|---|
| 2018/0124687 A1* | 5/2018 | Park | ...................... | H04W 48/12 |
| 2018/0324780 A1* | 11/2018 | Novlan | ............... | H04L 43/0811 |
| 2019/0081687 A1* | 3/2019 | Sadiq | .................... | H04L 5/0023 |
| 2020/0204239 A1* | 6/2020 | Kang | ................... | H04B 7/0632 |

OTHER PUBLICATIONS

"Considerations on beam recovery mechanism", 3GPP TSG RAN WG1 Meeting #88, R1-1702078, Athens, Greece, Feb. 13-27, 2017, pp. 1-4.

\* cited by examiner

TECHNIQUE FOR COMMUNICATING A RADIO QUALITY REPORT

TECHNICAL FIELD

The present disclosure relates to a technique for communicating a radio quality report. More specifically, and without limitation, methods and devices are provided for communicating a radio quality report from a second device to a first device.

BACKGROUND

One of the main features of the first version of the New Radio (NR) or Fifth Generation (5G) standard specified by the Third Generation Partnership Group (3GPP) is an improved support for beamforming and a support of both digital and analog radios. Beamforming is supported for data as well as for common and dedicated control channels.

In NR, several synchronization signals (SSs) and reference signals (RSs) are defined. In order to connect to a radio access network (RAN) or to detect signals from base stations (BSs, also denoted as network nodes), a radio device (e.g., a user equipment, UE) needs to acquire network synchronization with respect to the relevant BSs. The SSs are used for tuning the frequency reference of the radio device relative to the RAN or BS and for finding the proper timing of the received signal from the network.

The synchronization and access procedure may involve and utilize several signals. A primary synchronization signal (PSS) allows the detection of a signal transmitted from a BS in the presence of a high frequency offset, e.g., up to tens of parts per million (ppm), and unknown symbol and frame timing. The PSS thus provides a network timing reference and a coarse frequency reference. The time reference and the frequency reference are commonly estimated by applying a sliding matched-filtering operation in the time domain with respect to different sequences of the RSs and different offset hypotheses for the frequency. A peak at the output of the matched filter indicates the presence of a PSS, and the corresponding time and frequency offsets yield the required alignment parameters. 3GPP has specified Zadoff-Chu sequences as the PSSs in the Long Term Evolution (LTE) standard. A modified version of such PSSs is one of a few contenders for NR. A secondary synchronization signal (SSS) allows additional frequency adjustments and channel estimation while at the same time providing fundamental network information, e.g. a cell identity (ID). A physical broadcast channel (PBCH) provides a subset of system information for random access. The combination of the PSS, the SSS, and the PBCH is referred to as SS block (SSB).

The beamforming of NR utilizes a large number of steerable antennas to improve data communication as to signal quality, spatial multiplexing, and capacity. In order to benefit from the large number of antennas on the transmission side (e.g., the BS side), channel knowledge is required. For this purpose, the 3GPP NR standard provides two means. The BS can instruct the radio device to transmit RSs in the uplink, from which the BS gains knowledge as to how to transmit in the downlink by virtue of channel reciprocity between uplink and downlink.

The BS can also transmit channel state information (CSI) reference signals (CSI-RSs) in the downlink and instruct the radio device to measure on the CSI-RS and transmit a radio quality report comprising CSI back to the BS using standardized CSI-formats. The radio quality reports can be transmitted either on the physical uplink control channel (PUCCH) or multiplexed with data on the physical uplink shared channel (PUSCH). In the absence of uplink RSs, the radio quality report is required to benefit from large antenna systems to provide good downlink data coverage.

However, due to large differences in transmit power or beamforming gain of the BS as compared to the radio device, the radio quality of a physical downlink channel (e.g., using beamforming) can be very good even when the PUCCH or the PUSCH are out of coverage. Consequently, a physically available downlink channel cannot be used, since a radio quality report cannot be acquired.

SUMMARY

Accordingly, there is a need for improving a rate of successfully received radio quality reports in at least some situations, particularly under asymmetric capabilities as to at least one of transmit power and beamforming gain.

As to a first method aspect, a method of receiving a radio quality report at a first device from a second device is provided. The method may comprise or initiate a step of transmitting, to the second device, a first control message indicative of configuring the second device with reporting a radio quality report over a secondary connection that is different from a primary connection between the first device and the second device. The method may further comprise or initiate a step of transmitting, to the second device over the primary connection, at least one reference signal (RS). The method may further comprise or initiate a step of receiving, from the second device over the secondary connection, the radio quality report. The radio quality report may be indicative of a radio quality of the primary connection based on the at least one RS. The method may further comprise or initiate a step of transmitting, based on the radio quality report, a second control message and/or data from the first device over the primary connection to the second device.

The transmission of the second control message and/or the data based on the radio quality report may be implemented by a transmission of any signal based on the radio quality report, e.g. encoded with the second control message and/or the data. For example, transmission parameters of the transmission may be derived from the radio quality report.

The first device may be a base station (BS), e.g. a next generation NodeB (gNB) according to 3GPP NR. The second device may be a radio device, e.g., a mobile station or a user equipment (UE). The first method aspect may be performed by or implemented at the first device.

Any one of the primary connection and the secondary connection may be a master connection. Herein, the expressions "primary connection" and "secondary connection" may or may not rank the respective connections.

The primary connection may comprise a first radio connection terminated at the first device. The radio quality report may be indicative of the radio quality of the first radio connection. The primary connection may comprise a physical downlink control channel (PDCCH). The RS may be a signal in the PDCCH of the primary connection.

The secondary connection may comprise a data channel and/or a control layer higher than the physical layer (e.g., the control layer for radio resource control, RRC, and/or mobility reports). The radio quality report may be received in the data channel and/or on the higher control layer.

The RS may comprise a channel state information reference signal (CSI-RS) and/or a synchronization signal block (SSB).

The second control message may be indicative of an updated beamforming configuration and/or an updated link adaptation. Alternatively or in addition, the transmission of the second control message and/or the data may use the updated beamforming configuration and/or the updated link adaptation.

Embodiments of the technique can enable acquiring the radio quality report indicative of channel information, e.g. channel state information (CSI) and/or a channel quality indicator (CQI), related to the primary connection (e.g., the first radio connection) over the secondary connection different from the primary connection. The primary connection may also be referred to as the own connection (e.g., from the perspective of the first device). The secondary connection may use a data channel and/or a control layer higher than the physical layer for channel measurements for beamforming purposes. The data channel and/or the control layer higher than the physical layer may also briefly be referred to as higher layer. The first method aspect may be implemented in a BS (i.e., radio base station, RBS) to (e.g., selectively) activate higher layer radio quality reporting when conventional lower layer radio quality reporting on the own connection is no longer reliable or available.

Embodiments of the technique include a BS that configures a radio device to report a radio quality of one or a set of RSs using a higher layer protocol (e.g. the RRC and/or mobility reports layer), wherein the one or more RSs are transmitted over a primary connection, e.g. a first (e.g. frequency) band. The radio device transmits the radio quality report over a data channel and/or a higher layer control channel to a radio BS using a secondary connection, e.g. a second (e.g. frequency) band, with better uplink coverage compared to the first band, e.g. the first (e.g. frequency) band. A radio BS then transmits a signal, e.g. data and/or a second control message, utilizing the reported radio quality, upon which antenna weights (for beamforming) and/or a modulation and coding scheme (MCS, for link adaptation) are selected.

The first control message indicative of configuring the second device with the reporting over the secondary connection may be implemented by a first control message indicative of a configuration for the reporting over the secondary connection. The first control message may control the second device to apply (e.g., update or change) the reporting over the secondary connection unconditionally or from now on. Alternatively, the first control message may be indicative of a condition when to apply (e.g., update or change) the reporting over the secondary connection. For example, a trigger of updating or changing the radio quality reporting (i.e., updating or changing a radio quality reporting configuration), e.g., by transmitting the first control message and/or by means of the condition, may be based on an estimate of the radio quality of the uplink on the primary connection, e.g. the first (e.g. frequency) band, and/or on an estimate of the uplink on the secondary connection, e.g. the second (frequency) band.

The first control message may be transmitted using radio resource control (RRC) signaling. Alternatively or in addition, the first control message may be transmitted over the primary connection.

The at least one RS may be generated at a first layer of a protocol stack. The radio quality report may be included in a protocol data unit (PDU) of a second layer of the protocol stack. The second layer may be higher in the protocol stack than the first layer.

The primary connection and the secondary connection may be anchored at an anchoring layer of the protocol stack at the first device. The first layer may be lower in the protocol stack than the anchoring layer. Alternatively or in addition, the second layer may be equal to or higher than the anchoring layer. The anchoring layer, the first layer and/or the second layer may be layers of the protocol stack at the first device for at least one of the primary connection and the secondary connection. The anchoring layer may be a packet data convergence protocol (PDCP) layer or an RRC layer. The first layer may be a physical (PHY) layer. Alternatively or in addition, the second layer may be an RRC layer.

The primary connection and the secondary connection may be different in at least one of a spatial domain and a frequency domain. The primary connection may use a first radio band. The secondary connection may use a second radio band that is different from the first radio band.

The transmission of a signal, e.g. a second control message and/or data, may use at least one of a beamforming configuration and a link adaptation of the primary connection based on the received radio quality report.

Updating the beamforming configuration may comprise changing or adjusting antenna weights, e.g., based on a received precoding matrix indicator (PMI) and/or a received rank indicator (RI) included in the radio quality report. Updating the link adaptation may refer to updating a modulation and coding scheme (MCS), e.g., based on CQI included in the radio quality report. The updating may relate to the downlink of the primary connection.

Updating the beamforming configuration may be based on at least one of a PMI and an RI included in the radio quality report.

Different RSs may be transmitted through multiple antenna ports, respectively. Updating the beamforming configuration may use the antenna port with the highest radio quality reported in the radio quality report. The radio quality report may be indicative of RI=1. Alternatively or in addition, updating the beamforming configuration may use a junction (e.g., a complex-valued combination) of the multiple antenna ports based on their relative radio quality reported in the radio quality report.

Moreover, updating the beamforming configuration may use the multiple antenna ports for a multiple-input multiple-output (MIMO) channel in the primary connection, if the radio quality report is indicative of RI>1.

Updating the link adaptation may be based on a received CSI and/or CQI included in the radio quality report.

The first device may comprise a first BS configured to provide radio access to one or more radio devices. The second device may comprise a radio device configured for radio access to one or more BSs. The radio device may be a user equipment (UE).

The primary connection may comprise a first radio connection of the radio device terminated at the first BS. The secondary connection may comprise a second radio connection of the radio device terminated at a second BS other than the first BS.

The secondary connection may further comprise a backhaul link from the second BS to the first BS. The first BS and the second BS may be BSs of different vendors and/or different radio access technologies. For example, the first BS may provide radio access according to 3GPP NR on the primary connection to the radio device, and the second BS may provide radio access according to 3GPP LTE on the secondary connection to the radio device.

Receiving the radio quality report at the first BS from the radio device may comprise receiving the radio quality report forwarded from the second BS. The radio quality report may be forwarded over a backhaul link between the first BS and the second BS.

The radio device may be in dual connectivity with the first BS and the second BS on the primary connection and on the secondary connection, respectively. For example, the secondary connection may use the second BS as an additional and/or intermediary receiver of the second device. The secondary connection may use dual connectivity (DC), e.g., instead of carrier aggregation (CA) or a supplementary uplink (SUL).

By way of example, the secondary connection may comprise a radio connection between the second device and a master node, e.g. according to the Evolved Universal Mobile Telecommunications System (UMTS) Terrestrial Radio Access Network (E-UTRAN) NR DC (EN-DC). The master node may be responsible for a radio-access control plane of the second device. The second BS, e.g. an evolved Node B (eNB) according to 3GPP LTE, may act as the master node for the second device. The first BS, e.g. a gNB according to 3GPP NR, may act as a secondary node for the second device.

Alternatively or in addition any other form of set-up, e.g. carrier aggregation (CA) or supplementary uplink (SUL), may be used which comprises at least two data-paths from the second device to the first device. The radio device may be connected to a Master Cell or Master Cell Group (MCG) and a Secondary Cell or Secondary Cell Group (SCG). The primary connection may refer to a connection to the MCG, and the secondary connection may refer to a connection to the SCG, or vice versa.

The secondary connection may comprise a data channel on which the radio quality report is received. The data channel may carry the radio quality report, e.g., as an RRC report, and/or other RRC reports.

The transmission of the at least one RS may comprise beamforming transmissions of different RSs using different beamforming directions, respectively. The received radio quality report may be indicative of the beamforming direction with the highest radio quality at the second device. Each of the beamforming transmissions may transmit the respective RS directionally in a potential beamforming direction towards the second device. The radio quality may be defined and/or reported in terms of a signal-to-noise-ratio (SNR) or a signal-to-interference-and-noise-ratio (SINR).

The beam direction (or briefly: beam) may be indicated and/or reported in the radio quality report in terms of the PMI, an RS resource indicator and/or a beam identifier.

The at least one RS may comprise a channel state information reference signal (CSI-RS) and/or a synchronization signal block (SSB). The SSB may be a (e.g., conventional) SSB for cell coverage. Alternatively or in addition, the SSB may be a dedicated SSB that covers an area comprising the second device. The area covered by the dedicated SSB may be smaller than a cell served by the first device.

Conventional SSBs may be transmitted omni-directionally, e.g., isotropically along the horizontal directions. A dedicated SSB may be transmitted using a narrow beam. By using a narrow beam, a lower power level than for full cell coverage may advantageously be selected. The dedicated SSB may comprise the same cell identity (ID) as the conventional SSB. Alternatively or in addition, the dedicated SSB may comprise a cell ID different from the conventional SSB. Advantageously, based on different cell IDs, multiple RSs may be transmitted within the same time and/or frequency resource. The dedicated SSB may be located (e.g., in time and/or frequency) outside of a search grid for the conventional SSBs.

The first control message may be indicative of a subset of a set of SSBs transmitted from the first device. The first control message may be indicative of the reporting configuration of the radio quality report based on the SSBs in a subset of a set of SBBs transmitted from the first device or transmitted in a cell served by the first device. Alternatively or in addition, the first control message may be indicative of configuring the second device with autonomously detecting an SSB and reporting the radio quality of the detected SSB.

The first control message may be indicative of configuring the second device with periodically reporting the radio quality report. The second device may be configured by the first control message with reporting the radio quality periodically. The first control message may be indicative of a periodicity of the radio quality report.

Alternatively or in addition, the first control message may be indicative of configuring the second device with reporting the radio quality report triggered by an event. The second device may be configured by the first control message with reporting the radio quality responsive to an event. The first control message may be indicative of the event triggering the radio quality report.

The event-triggered reporting may also be referred to as event-based reporting or aperiodic reporting. The trigger of the reporting may comprise measuring a signal strength, received power, SNR and/or SINR of the RS, which is less than a predefined or configured threshold value.

The periodic reporting of the radio quality and the aperiodic reporting of the radio quality may be combined. The first control message may be indicative of configuring the second device with both periodic and aperiodic reporting of the radio quality.

The radio quality report may be indicative of at least one of a RS received power (RSRP), a SNR, a SINR, and a RS received quality (RSRQ) of the RS at the second device.

The transmission of the configuration message to the second device may be triggered by a failure of decoding uplink control information (UCI) from the second device. The failure to decode UCI may refer to a cyclic redundancy check (CRC) error, a Bit Error Rate (BER), a Block Error Rate (BLER) and or a packet error rate (PER).

The first device may estimate an uplink radio quality of the primary connection. The first device may further perform or initiate the transmission of the configuration message to the second device if the uplink radio quality is less than a predefined or configured value of an uplink radio quality threshold.

The uplink radio quality may comprise at least one of a SNR, a SINR and a received power of uplink signals over the primary connection from the second device to the first device.

The uplink radio quality may be estimated over a time period. The transmission of the first control message may be performed or initiated if the uplink radio quality is less than the value of the uplink radio quality threshold over the time period.

The first control message may be indicative of a value of a first downlink radio quality threshold that triggers the second device to transmit the radio quality report over the secondary connection if a downlink radio quality of the primary connection at the second device is less than the indicated value of the first downlink radio quality threshold. The first downlink radio quality threshold may further trigger the second device to refrain from transmitting a radio quality report over the primary connection if the downlink radio quality of the primary connection is less than the indicated value of the first downlink radio quality threshold. Alternatively or in addition, the first control message may further be indicative of a value of a second downlink radio quality threshold that triggers the second device to refrain from transmitting a radio quality report over the primary connection if the downlink radio quality of the primary connection is less than the indicated value of the second downlink radio quality threshold. The value of the second downlink radio quality threshold may be less than the value of the first downlink radio quality threshold.

The downlink radio quality may comprises at least one of a RSRP, a SNR, a SINR, and a RSRQ of the at least one RS or other downlink signals from the first device. As to a second method aspect, a method of transmitting a radio quality report to a first device from a second device is provided. The method may comprise or initiate a step of receiving, from the first device, a first control message indicative of configuring the second device with reporting a radio quality report over a secondary connection that is different from a primary connection between the first device and the second device. The method may further comprise or initiate a step of measuring, at the second device, a radio quality based on at least one RS received over the primary connection from the first device. The method may further comprise or initiate a step of transmitting, to the first device over the secondary connection, the radio quality report. The radio quality report may be indicative of the measured radio quality. The method may further comprise or initiate a step of receiving, based on the transmitted radio quality report, a second control message and/or data from the first device over the primary connection at the second device.

The reception of the second control message and/or the data based on the transmitted radio quality report may be implemented by a reception of any signal in accordance with the transmitted radio quality report, e.g. encoded with the second control message and/or the data. For example, parameters for receiving the signal may be in accordance with the radio quality report.

The first device may be a BS. The second device may be a radio device, e.g. a UE. The second method aspect may be performed by or implemented at the second device.

The second method aspect may further comprise any feature, or may comprise or initiate any step, disclosed in the context of the first method aspect or may comprise a feature or step corresponding thereto. For example, the first control message may be received using RRC signaling. Alternatively or in addition, the first control message may be received over the primary connection.

Moreover, the first method aspect may be performed at or by a transmitting station (briefly: transmitter), e.g., a BS providing radio access to a radio device. The terminology or functionality of the transmitter may refer to the transmission of the second control signal or the data, e.g., any downlink transmission. Alternatively, or in combination, the second method aspect may be performed at or by a receiving station (briefly: receiver), e.g., a radio device configured for radio access to a BS. The terminology or functionality of the receiver may refer to the reception of the second control signal or the data, e.g., any downlink transmission.

In any aspect, the primary connection (e.g., the channel or link used for the data transmission and a radio reception), i.e., the channel between the first device (e.g., the first BS) and the second device (e.g., a radio device or UE) may comprise multiple subchannels or subcarriers (e.g., in the frequency domain). Alternatively, or in addition, the primary connection may comprise one or more slots for a plurality of modulation symbols (e.g., in the time domain). Alternatively, or in addition, the primary connection may comprise a directional transmission (also: beamforming transmission) at the transmitter, a directional reception (also: beamforming reception) at the receiver and/or a multiple-input multiple-output (MIMO) channel with two or more spatial streams (e.g., in the spatial domain).

The first device, e.g. a first BS, and the second device, e.g. a radio device or UE, may be spaced apart. The first device and the second device may be in data or signal downlink communication exclusively by means of the radio communication. The first device and the second device may be in data or signal uplink communication exclusively by means of the radio communication. Alternatively or in addition, the uplink communication between the second device and the first device may comprise a radio communication from the second device to a second BS and a subsequent backhaul from the second BS to the first device.

In any aspect, the first device, e.g. a first BS, and the second device, e.g. a radio device or UE, may form, or may be part of, a radio network, e.g., according to the Third Generation Partnership Project (3GPP) or according to the standard family IEEE 802.11 (Wi-Fi). The radio network may be a radio access network (RAN) comprising one or more BSs. Alternatively, or in addition, the radio network may be a vehicular, ad hoc and/or mesh network. The first method aspect may be performed by one or more embodiments of the first device in the radio network. The second method aspect may be performed by one or more embodiments of the second device in the radio network.

Any of the radio devices may be a mobile or wireless device, e.g., a 3GPP user equipment (UE) or a Wi-Fi station (STA). The radio device may be a mobile or portable station, a device for machine-type communication (MTC), a device for narrowband Internet of Things (NB-IoT) or a combination thereof. Examples for the UE and the mobile station include a mobile phone, a tablet computer and a self-driving vehicle. Examples for the portable station include a laptop computer and a television set. Examples for the MTC device or the NB-IoT device include robots, sensors and/or actuators, e.g., in manufacturing, automotive communication and home automation. The MTC device or the NB-IoT device may be implemented in a manufacturing plant, household appliances and consumer electronics.

Any of the radio devices may be wirelessly connected or connectable (e.g., according to a radio resource control, RRC, state or active mode) with any of the BSs. Herein, a BS may encompass any station that is configured to provide radio access to any of the radio devices. The BSs may also be referred to as transmission and reception point (TRP), radio access node or access point (AP). The BS or one of the radio devices functioning as a gateway (e.g., between the radio network and the RAN and/or the Internet) may provide a data link to a host computer providing the data. Examples for the BSs may include a 3G base station or Node B, 4G base station or eNodeB, a 5G base station or gNodeB, a Wi-Fi AP and a network controller (e.g., according to Bluetooth, ZigBee or Z-Wave).

The RAN may be implemented according to the Global System for Mobile Communications (GSM), the Universal Mobile Telecommunications System (UMTS), 3GPP Long Term Evolution (LTE) and/or 3GPP New Radio (NR).

Any aspect of the technique may be implemented in a Physical Layer (PHY) and/or a Medium Access Control (MAC) layer (e.g., as the first layer). Alternatively or in combination, any aspect of the technique may be implemented in at least one of the MAC layer (e.g., in case of a PHY layer as the first layer), a Radio Link Control (RLC) layer, a packet data convergence protocol (PDCP) layer, and/or a Radio Resource Control (RRC) layer (e.g., as the second layer) of the protocol stack for a radio communication of at least the primary connection.

As to another aspect, a computer program product is provided. The computer program product comprises program code portions for performing any one of the steps of the method aspect disclosed herein when the computer program product is executed by one or more computing devices. The computer program product may be stored on a computer-readable recording medium. The computer program product may also be provided for download, e.g., via the radio network, the RAN, the Internet and/or the host computer. Alternatively, or in addition, the method may be encoded in a Field-Programmable Gate Array (FPGA) and/or an Application-Specific Integrated Circuit (ASIC), or the functionality may be provided for download by means of a hardware description language.

As to a first device aspect, a device for receiving a radio quality report at a first device from a second device is provided. The device may be configured to perform any one of the steps of the first method aspect. Alternatively, or in addition, the device may comprise a radio quality report configuration unit configured to transmit, to the second device, a first control message indicative of configuring the second device with reporting a radio quality report over a secondary connection that is different from a primary connection between the first device and the second device. The device may further comprise an RS transmission unit configured to transmit, to the second device over the primary connection, at least one RS. The device may further comprise a radio quality report reception unit configured to receive, from the second device over the secondary connection, the radio quality report that is indicative of a radio quality of the primary connection based on the at least one RS. The device may further comprise a data transmission unit configured to transmit, based on the radio quality report, at least one of a second control message and data from the first device over the primary connection to the second device.

As to a second device aspect, a device for transmitting a radio quality report to a first device from a second device is provided. The device may be configured to perform any one of the steps of the second method aspect. Alternatively, or in addition, the device may comprise a radio quality report configuration reception unit configured to receive, from the first device, a first control message indicative of configuring the second device with reporting a radio quality report over a secondary connection that is different from a primary connection between the first device and the second device. The device may further comprise an RS measurement unit configured to measure, at the second device, a radio quality based on at least one RS received over the primary connection from the first device. The device may further comprise a radio quality report transmission unit configured to transmit, to the first device over the secondary connection, the radio quality report. The radio quality report may be indicative of the measured radio quality. The device may further comprise a data reception unit configured to receive, based on the transmitted radio quality report, at least one of a second control message and data from the first device over the primary connection at the second device.

As to a further first device aspect, a device for receiving a radio quality report at a first device from a second device is provided. The device comprises at least one processor and a memory. Said memory may comprise instructions executable by said at least one processor whereby the device is operative to perform any one of the steps of the first method aspect.

As to a further second device aspect, a device for transmitting a radio quality report to a first device from a second device is provided. The device comprises at least one processor and a memory. Said memory may comprise instructions executable by said at least one processor whereby the device is operative to perform any one of the steps of the second method aspect.

As to a still further aspect a communication system including a host computer is provided. The host computer may comprise a processing circuitry configured to provide user data, e.g., depending on the location of the UE determined in the locating step. The host computer may further comprise a communication interface configured to forward user data to a cellular network for transmission to a user equipment (UE), wherein the UE comprises a radio interface and processing circuitry.

A processing circuitry of the cellular network may be configured to execute any one of the steps of the first method aspect. Alternatively or in addition, the processing circuitry of the UE may be configured to execute any one of the steps of the second method aspect.

The communication system may further include the UE. Alternatively, or in addition, the cellular network may further include one or more BSs and/or gateways configured to communicate with the UE and/or to provide a data link between the UE and the host computer using the first method aspect and/or the second method aspect. For example, the data link may comprise at least one of the primary connection and the secondary connection.

The processing circuitry of the host computer may be configured to execute a host application, thereby providing the user data and/or any host computer functionality described herein. Alternatively, or in addition, the processing circuitry of the UE may be configured to execute a client application associated with the host application.

Any one of the devices, the UE, the BS, the system or any node or station for embodying the technique may further include any feature disclosed in the context of the method aspects, and vice versa. Particularly, any one of the units and modules, or a dedicated unit or module, may be configured to perform or initiate one or more of the steps of the any one of the method aspects.

BRIEF DESCRIPTION OF THE DRAWINGS

Further details of embodiments of the technique are described with reference to the enclosed drawings, wherein.

DETAILED DESCRIPTION

In the following description, for purposes of explanation and not limitation, specific details are set forth, such as a specific network environment in order to provide a thorough understanding of the technique disclosed herein. It will be apparent to one skilled in the art that the technique may be practiced in other embodiments that depart from these specific details. Moreover, while the following embodiments are primarily described for a New Radio (NR) or 5G implementation, it is readily apparent that the technique described herein may also be implemented for any other radio communication technique, including 3GPP LTE (e.g., LTE-Advanced or a related radio access technique such as MulteFire), in a Wireless Local Area Network (WLAN) according to the standard family IEEE 802.11, for Bluetooth according to the Bluetooth Special Interest Group (SIG), particularly Bluetooth Low Energy, Bluetooth Mesh Networking and Bluetooth broadcasting, for Z-Wave according to the Z-Wave Alliance or for ZigBee based on IEEE 802.15.4.

Moreover, those skilled in the art will appreciate that the functions, steps, units and modules explained herein may be implemented using software functioning in conjunction with a programmed microprocessor, an Application Specific Integrated Circuit (ASIC), a Field Programmable Gate Array (FPGA), a Digital Signal Processor (DSP) or a general purpose computer, e.g., including an Advanced RISC Machine (ARM). It will also be appreciated that, while the following embodiments are primarily described in context with methods and devices, the invention may also be embodied in a computer program product as well as in a system comprising at least one computer processor and memory coupled to the at least one processor, wherein the memory is encoded with one or more programs that may perform the functions and steps or implement the units and modules disclosed herein.

Figure 1:
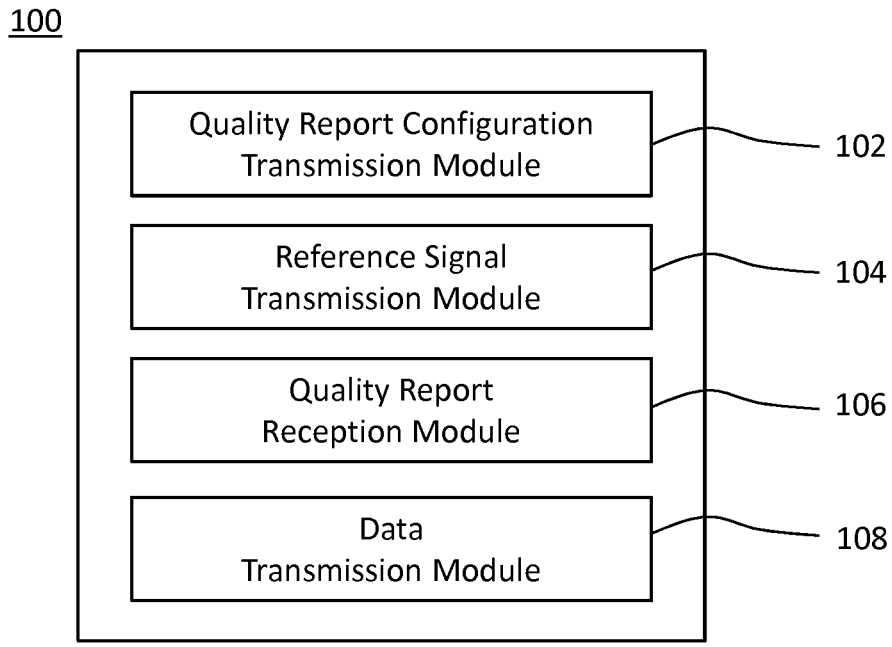
FIG. 1 schematically illustrates a block diagram of an embodiment of a device for receiving a radio quality report at a first device from a second device.

FIG. 1 schematically illustrates an example block diagram of a device for receiving a radio quality report. The first radio device is generically referred to by reference sign 100. The first device may be a device 100 for configuring a second device with reporting the radio quality report and receiving the radio quality report accordingly.

The device 100 comprises a radio quality report configuration transmission module 102 that is adapted to transmitting a first control message indicative of configuring a second device with reporting a radio quality report using a secondary connection that is different from a primary connection between the first device 100 and the second device. The primary connection may refer to a first, e.g. direct, radio connection. The device 100 further comprises a reference signal (RS) transmission module 104 that is adapted to transmitting at least one RS to the second device over the primary connection. The device 100 further comprises a radio quality report reception module 106 that is adapted to receiving, from the second device over the secondary connection, a radio quality report indicative of a radio quality of the primary connection based on the at least one RS. The device 100 further includes a data transmission module 108 that is adapted to transmitting, over the primary connection, a signal, e.g. data and/or a second control message. The transmission of the signal, e.g. data and/or the second control message, may be based on the radio quality report. In more detail, the transmission of the signal, e.g. data and/or the second control message, may be based on the radio quality report by comprising an update of a beamforming configuration and/or a link adaptation.

Any of the modules of the receiving device 100 may be implemented by units configured to provide the corresponding functionality.

The device 100 may also be referred to as, or may be embodied by, a base station or a node. The device 100 and the second device are in a, e.g. direct, radio communication at least for the transmission of the at least one RS. The device 100 and the second device are in a, e.g. dual connectivity, communication at least for the transmission of the radio quality report configuration message and the reception of the radio quality report.

Figure 2:
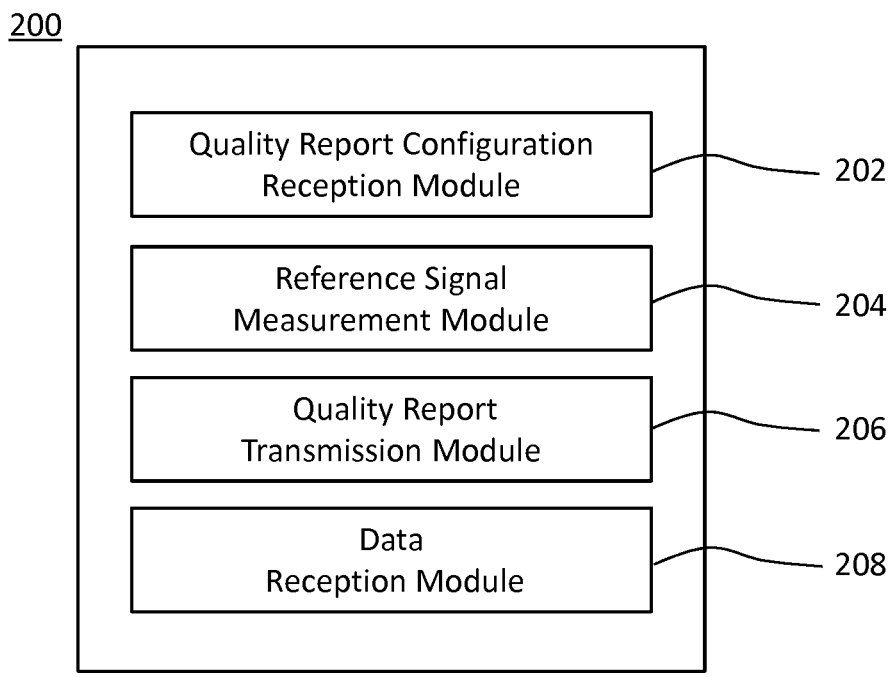
FIG. 2 schematically illustrates a block diagram of an embodiment of a device for transmitting a radio quality report to a first device from a second device.

FIG. 2 schematically illustrates an example block diagram of a device for transmitting a radio quality report. The device is generically denoted as the second device and referred to by reference sign 200. The second device may be a device 200 for transmitting the radio quality report upon configuration by a first device.

The device 200 comprises a radio quality configuration reception module 202 that is adapted to receiving a first control message indicative of configuring the second device 200 with radio quality reporting over a secondary connection that is different from the primary connection between the first radio device and the second radio device 200. The primary connection may refer to a, e.g. direct, radio connection between the first radio device and the second radio device 200. The device 200 further comprises an RS measurement module 204 that is adapted to measuring the radio quality of at least one RS received from the first device over the primary connection. The device 200 further comprises a radio quality report transmission module 206 that is adapted to transmitting over the secondary connection a radio quality report indicative of the quality of the received at least one RS. The device 200 further comprises a data reception module 208 that is adapted to receiving a signal, e.g. data and/or a second control message, from the first device 100, based on the radio quality report. The reception of the signal may depend on the radio quality report in terms of an updated beamforming configuration and/or a link adaptation.

Any of the modules of the device 200 may be implemented by units configured to provide the corresponding functionality.

The device 200 may also be referred to as, or may be embodied by, a radio device or a UE. The device 200 and a transmitter of the radio quality reporting configuration are in a, e.g. direct, radio communication at least for the reception of the at least one RS at the device 200. The device 200 and the transmitter of the radio quality reporting configuration may be in a, e.g. dual connectivity, communication for at least the reception of the radio quality reporting configuration and the transmission of the radio quality report.

Figure 3:
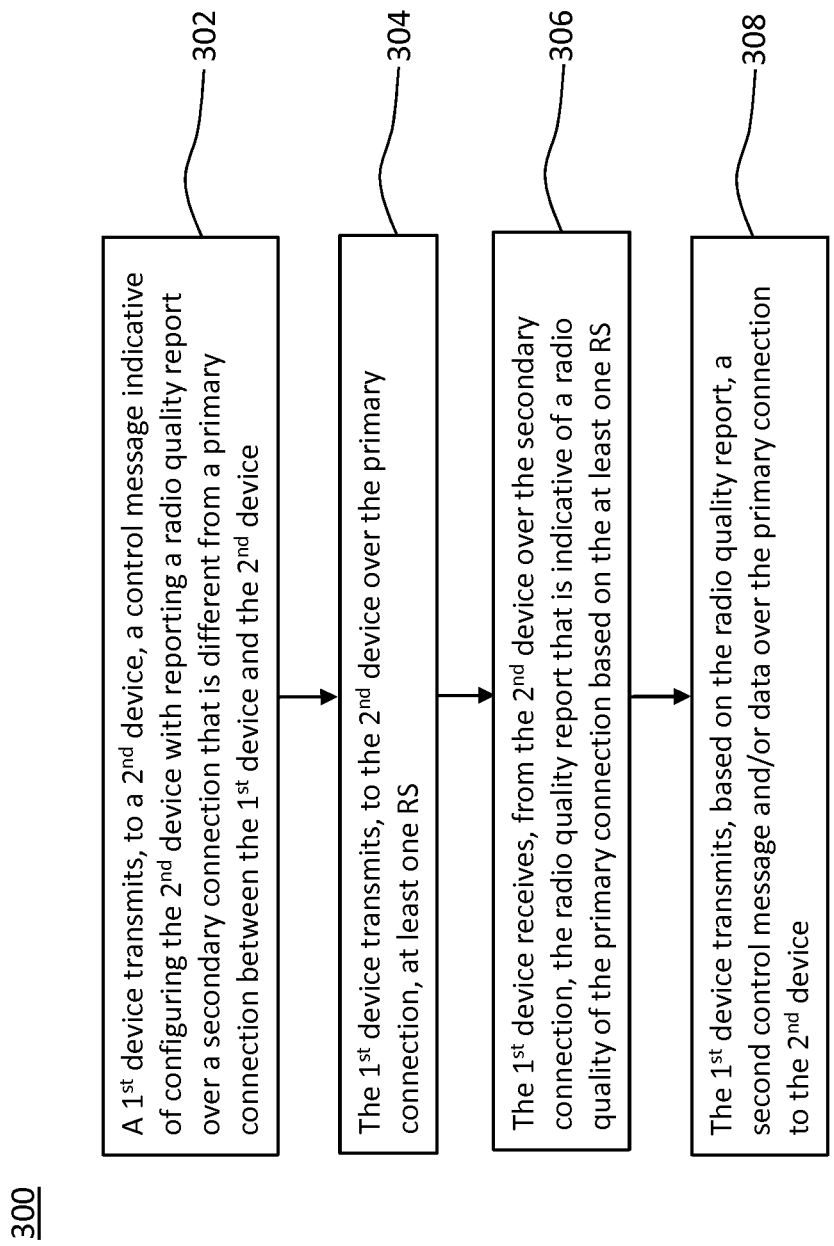
FIG. 3 shows an example flowchart for a method of receiving a radio quality report at a first device from a second device, which method may be implemented by the device of FIG. 1.

FIG. 3 shows an example flowchart for a method 300 of receiving a radio quality report at a first device from a second device. The method 300 comprises or initiates a step 302 of transmitting to the second device a first control message indicative of configuring the second device with reporting a radio quality report using a secondary connection that is different from the primary connection.

The method 300 further comprises or initiates a step 304 of transmitting to the second device over the primary connection at least one RS. The method 300 further comprises or initiates a step 306 of receiving from the second device over the secondary connection the radio quality report that is indicative of a radio quality of the primary connection based on the at least one RS. The method 300 further comprises a step 308 of transmitting, based on the radio quality report, from the first device over the primary connection a signal, e.g. a second control message and/or data, to the second device.

The method 300 may be implemented as a method of configuring the second device with reporting a radio quality report and receiving a radio quality report accordingly.

Transmitting the signal may be based on the radio quality report. For example, the transmission of the signal may use a beamforming configuration and/or a link adaptation that is updated according to the radio quality report at the first device and/or the second device.

The method 300 may be performed by the device 100. For example, the modules 102, 104, 106 and 108 may perform the steps 302, 304, 306 and 308, respectively.

Figure 4:
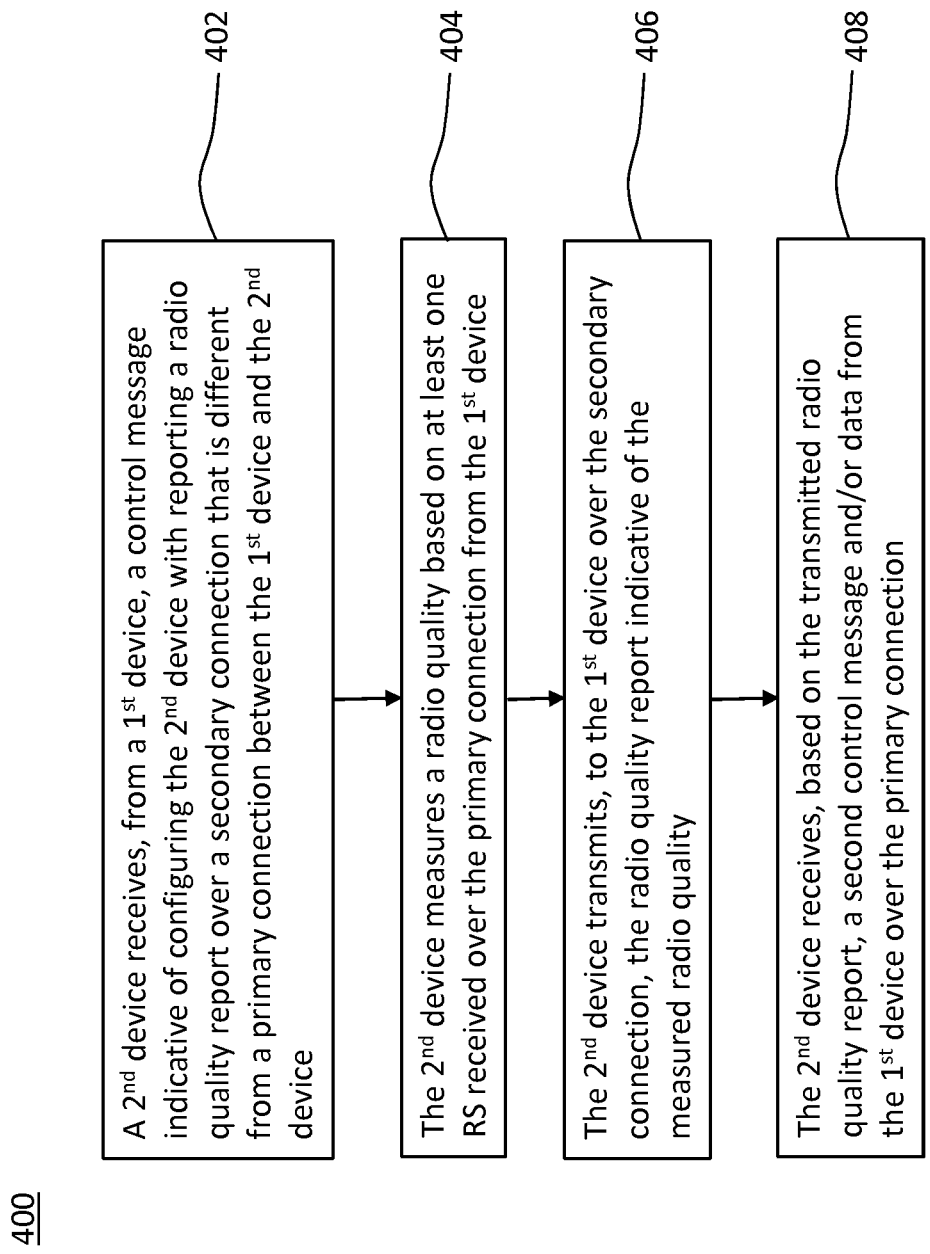
FIG. 4 shows an example flowchart for a method of transmitting a radio quality report to a first device from a second device, which method may be implemented by the device of FIG. 2.

FIG. 4 shows an example flowchart for a method 400 of transmitting a radio quality report to a first device from a second device. The method 400 comprises or initiates a step 402 of receiving at the second device from the first device a first control message indicative of configuring the second device with reporting a radio quality report. The method 400 further comprises or initiates a step 404 of measuring at the second device the quality of at least one RS received over the primary connection from the first device. The method 400 further comprises or initiates a step 406 of transmitting from the second device over a secondary connection a radio quality report indicative of the quality of the received at least one RS. The method 400 further comprises or initiates a step 408 of receiving a signal, e.g. a second control message or data, over the primary connection based on the radio quality report.

The method 400 may be implemented as a method of reporting a radio quality report.

The receiving of the signal may be based on a beamforming configuration and/or a link adaptation, which may be updated according to the radio quality report at the first device and/or the second device.

The method 400 may be performed by the device 200. For example, the modules 202, 204, 206 and 208 may perform the steps 402, 404, 406 and 408, respectively.

The technique may be applied to downlink (DL) as the primary connection and uplink (UL), dual connectivity or sidelink communications as the secondary connection.

The device 100 may be a base station (BS). The device 200 may be a radio device. Herein, any radio device may be a mobile or portable station and/or any radio device wirelessly connectable to a base station or RAN, or to another radio device. A radio device may be a user equipment (UE), a device for machine-type communication (MTC) or a device for (e.g., narrowband) Internet of Things (IoT). Two or more radio devices may be configured to wirelessly connect to each other, e.g., in an ad hoc radio network or via a 3GPP sidelink connection. Furthermore, any base station may be a station providing radio access, may be part of a radio access network (RAN) and/or may be a node connected to the RAN for controlling radio access. Further a base station may be an access point, for example a Wi-Fi access point.

According to the method 300 for receiving at a first device a radio quality report, e.g. indicative of CSI or CQI, over a secondary connection, a second device, e.g. a UE, is configured to detect and perform measurements on a set of RSs and transmit a radio quality report based on this set of RSs. The reference signals can in NR for example be SSBs or CSI-RS.

The second device, e.g. the UE, may be instructed to report periodically. Alternatively or in addition, the second device may be instructed to report based on a set of events, e.g. that one signal becomes weaker than a different signal. Reporting based on an event may also be referred to as aperiodic reporting or event triggered reporting. The event trigger optionally includes comparing a signal strength to a predefined threshold value and switching the reporting mode if the measured signal strength falls below the threshold value.

The radio quality report reflects the quality of the at least one RS received. For NR it can be configured to be either a received power estimate (RSRP) or a received quality estimate, e.g. SNR, SINR or RSRQ.

In a first class of embodiments, the second device, e.g. the UE, is instructed to report based on a set of configured CSI-RS. The first device, e.g. the base station, configures the second device, e.g. the UE, with reporting on the CSI-RS and a radio quality report setting, for example to report SINR and to report periodically. The first device, e.g. the base station, then transmits each CSI-RS in a direction that can be a potential beamforming direction for the second device. A set of second devices may also be referred to as users.

When receiving the radio quality report, the first device 100, e.g. the base station, then transmits a signal, e.g. control or data, using an antenna weight or a set of antenna weights based on the antenna weights used for transmitting the CSI-RSs and/or based on the reported radio quality. Using antenna weights for the reported radio quality may comprise receive beamforming at the first device. Alternatively or in addition, using antenna weights for the reported radio quality may comprise transmit beamforming at the second device.

In an embodiment, the same antenna weight is used as for the CSI-RS reported as having the highest radio quality. In other embodiments, a junction between multiple weights can be applied based on their relative radio quality.

In a second class of embodiments, which is combinable with the first class of embodiments, the second device, e.g. the UE, is instructed to measure on one or more SSBs. In some embodiments, the second device 200, e.g. the UE, is instructed to measure on a subset of all possible SSBs. In other embodiments, the second device, e.g. the UE, is configured to by itself detect the presence of an SSB and report the radio quality.

The one or more SSBs used for reporting can be the conventional SSBs used for cell coverage of the cell. In some embodiments, it is beneficial to have more narrow beams for input to beamforming. In this case, the first device 100, e.g. the base station, may transmit additional, e.g. dedicated, SSBs for this purpose. The first device 100, e.g. the base station, may transmit dedicated SSBs on the same location as its conventional SSBs. The dedicated SSBs can be transmitted out with lower power than the conventional SSBs for cell coverage to not be selected by other users. These SSBs can have the same cell ID or a different cell ID from the normal SSBs for cell coverage. With different cell IDs, multiple RSs can advantageously be transmitted on the same time and/or frequency resource.

Alternatively or in addition, the second device 200, e.g. the UE, can be instructed to measure on a different frequency that does not lie on the conventional search grid for SSBs. The transmitted, e.g. dedicated, SSBs may use the same cell ID or a cell ID that is different from the conventional SSBs for cell coverage.

The additional SSBs, e.g., independently of the frequency, may have beamforming weights employed and/or adjusted and reporting configurations as in the CSI-RS case.

In a third class of embodiments, which is combinable with the first and/or second class of embodiments, multiple second devices 200, e.g. UEs, may be instructed to measure on the same set of RSs in the step 402. In this class of embodiments, the beamforming weight of each RS may depend on a set of potential beamforming weights for all second devices 200, e.g. UEs, sharing the same set of RSs.

Reporting, according to the steps 306 and 406, link adaptation information and/or beam information over RRC using the secondary connection may be slower and/or may have a higher overhead compared to conventional CSI reporting. It may in some embodiments also be costlier in terms of the number of downlink RSs. Due to the potential increase in latency and/or signaling overhead, in a fourth class of embodiments, which is combinable with any other class of embodiments, the first device 100, e.g. the base station, only configures reporting the radio quality report over the secondary connection when it is expected to be needed.

In a first implementation of the fourth class of embodiments, reporting CSI over RRC is triggered based on measurements on uplink signals. In some embodiments, a SNR, a SINR or a RSRP is estimated over one or multiple uplink transmissions and compared to a threshold value. Reporting CSI over RRC using the secondary connection is configured if the uplink radio quality is below the threshold value.

In some embodiments, there is also a counter that triggers reporting CSI over RRC using the secondary connection if the uplink radio quality is below the threshold for a given time.

In other embodiments, reporting the CSI over RRC using the secondary connection is triggered by a failure to decode one or multiple transmissions on a control channel and/or a data channel (e.g., in the uplink and/or downlink) of the primary connection. E.g., the failure to decode a transmission may be detected by a CRC error. Alternatively or in addition, a failure to decode a transmission may be detected by means of a BER, a BLER or a PER.

In a second implementation of the fourth class of embodiments, which is combinable with the first implementation of the fourth class of embodiments, configuring the reporting of the radio quality over a secondary connection is triggered by a measurement in the downlink, for example that serving cell RSRP falls below a threshold value. In some embodiments, the second device 200, e.g. the UE, may be pre-configured with reporting the radio quality over the secondary connection but only start to report over the secondary connection once a condition as to the downlink radio quality (e.g., a serving cell RSRP) being below a threshold value is fulfilled.

In some embodiments of the fourth class of embodiments, the second device 200, e.g. the UE, is configured to release any regular, e.g. conventional, CSI reporting or sounding transmission once reporting CSI over RRC is configured. Conventional CSI reporting may, e.g. be abandoned by the second device 200, e.g. the UE, if the serving cell RSRP falls below a threshold value. The transmission of a radio quality report over a secondary connection may be triggered by the RSRP threshold value.

In another implementation of the fourth class of embodiments, a second stricter trigger is applied to remove the regular CSI reporting, having a range where both (regular or conventional CSI reporting over the primary connection and CSI reporting over the secondary connection) exist in parallel.

In some embodiments, both the beam information over RRC as well as the regular CSI reporting are used in parallel. In some embodiments, the higher layer beam information is used as a filtering criterion so that only reports indicating a strong beam from the RRC reporting are assumed correct. The indication of a beam may comprise a PMI, a CSI resource indicator (CRI) and/or some other spatial information in the radio quality report, e.g., in a CSI report.

Figure 5:
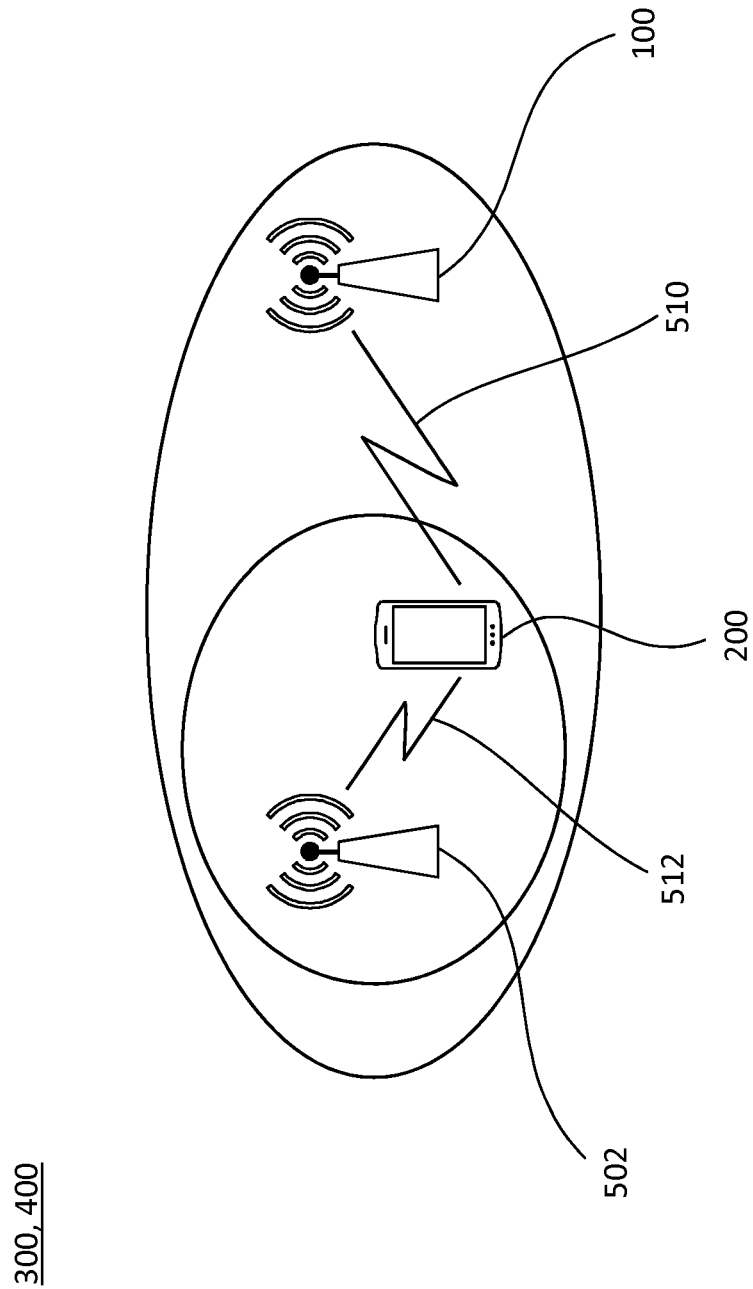
FIG. 5 schematically illustrates a first device and a second device in dual connectivity, which may embody the devices of FIGS. 1 and 2, respectively.

FIG. 5 schematically illustrates an exemplary embodiment of dual connectivity wherein a first base station 100 is in direct radio communication 510, at least in the downlink, with the radio device 200, which is in uplink and downlink communication with the second base station 502. The radio device 200 is in dual connectivity to the first base station 100 by virtue of at least the uplink communication 512 to the second base station 502, which may forward, e.g. over a backhaul link, control information and/or data to the first base station 100.

Figure 6:
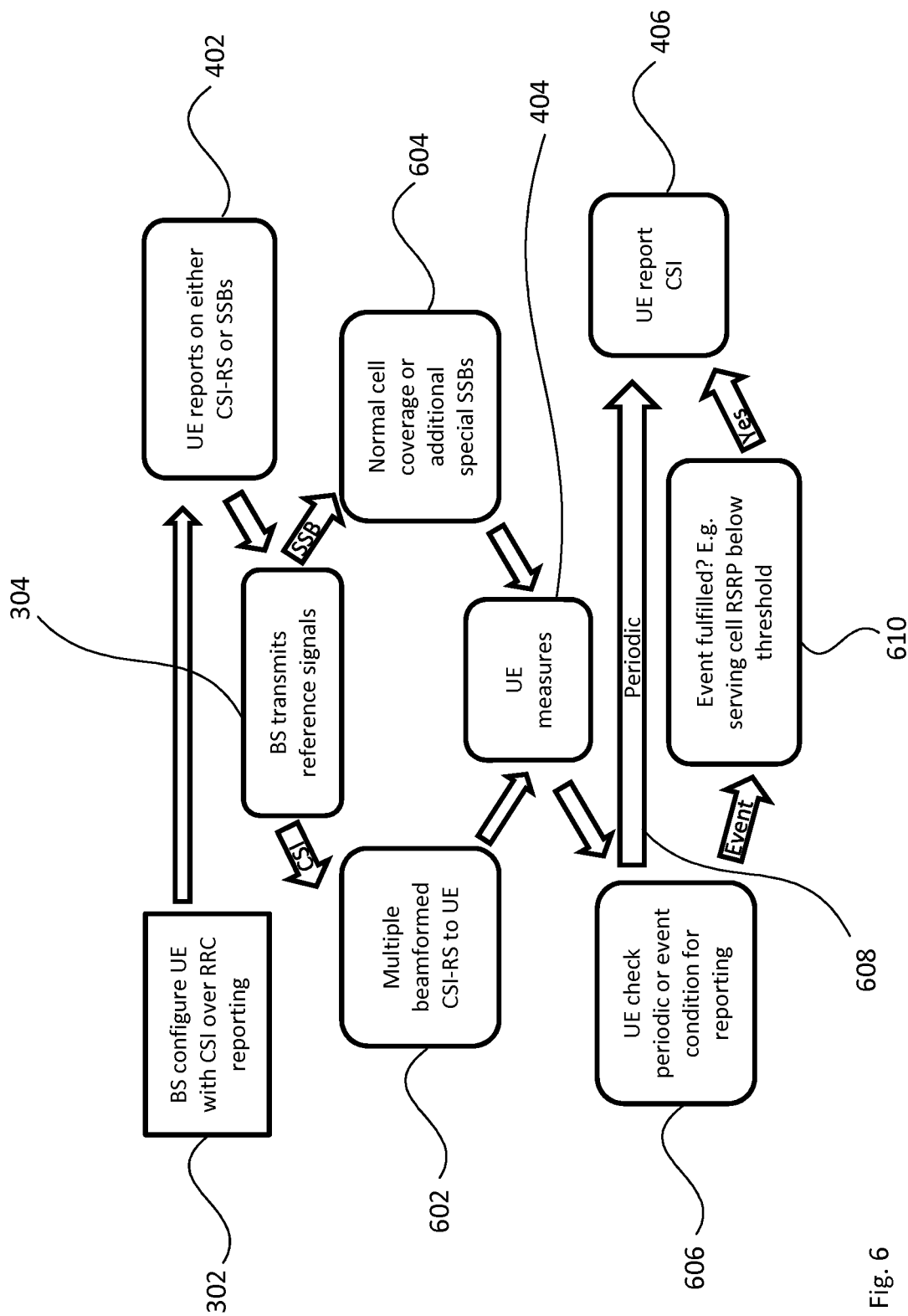
FIG. 6 shows an exemplary embodiment of combining the methods of FIGS. 3 and 4.

FIG. 6 shows an exemplary implementation of intertwining the method 300 of receiving a radio quality report and the method 400 of transmitting the radio quality report. According to the step 302, a BS 100 configures a UE 200 with reporting a radio quality report indicative of CSI over a secondary connection. The reporting configuration is received by the UE 200 according to the step 402. Following the radio quality report configuration message, the BS 100 transmits over the primary connection at least one RS according to the step 304. The RS may comprise multiple beamformed CSI-RSs in an optional substep 602 of the step 304. Alternatively or in addition, the RS may comprise one or more conventional (e.g. for cell coverage) or dedicated SSBs transmitted in a substep 604 of the step 304.

The UE 200 measures the radio quality based on the at least one received RS according to the step 404. The UE 200 determines if it is configured with periodic and/or aperiodic (e.g. event triggered) radio quality reporting in a substep 606 of the step 406. According to reference sign 608, the UE 200 proceeds to transmit a radio quality report periodically over the second connection if configured accordingly. Alternatively or in addition, the UE 200 verifies if an event occurred in a substep 610 of the step 406, if the UE 200 is configured with event-triggered radio quality reporting. For example, the UE 200 is configured with aperiodic reporting if the downlink radio quality (e.g., a master cell RSRP) is below a corresponding threshold according to an implementation of the step 406. Responsive to the downlink radio quality falling below the threshold, the UE 200 transmits an aperiodic radio quality report in the step 406.

Figure 7:
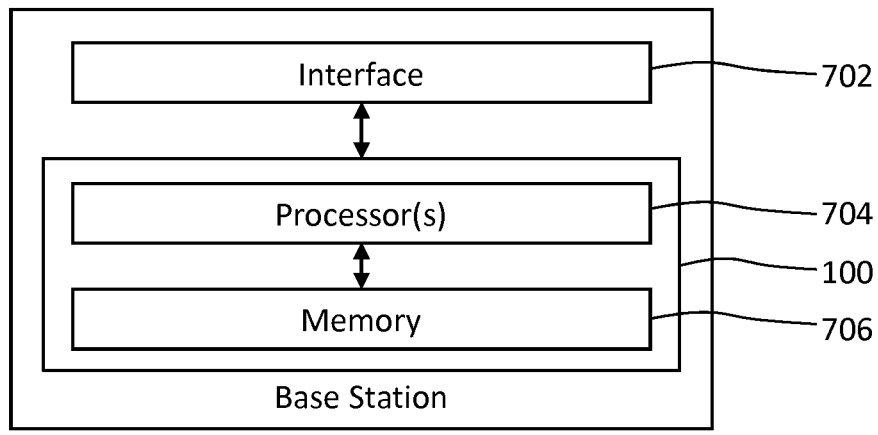
FIG. 7 shows an example schematic block diagram of a base station embodying the device of FIG. 1.

FIG. 7 shows a schematic block diagram for an embodiment of the device 100. The device 100 comprises one or more processors 704 for performing the method 300 and memory 706 coupled to the processors 704. For example, the memory 706 may be encoded with instructions that implement at least one of the modules 102, 104, 106 and 108.

The one or more processors 704 may be a combination of one or more of a microprocessor, controller, microcontroller, central processing unit, digital signal processor, application specific integrated circuit, field programmable gate array, or any other suitable computing device, resource, or combination of hardware, microcode and/or encoded logic operable to provide, either alone or in conjunction with other components of the device 100, such as the memory 706, transmitter functionality. For example, the one or more processors 704 may execute instructions stored in the memory 706. Such functionality may include providing various features and steps discussed herein, including any of the benefits disclosed herein. The expression "the device being operative to perform an action" may denote the device 100 being configured to perform the action.

As schematically illustrated in FIG. 7, the device 100 may be embodied by a base station (BS) 700, e.g., functioning as a transmitting base station. The BS 700 comprises a radio interface 702 coupled to the device 100 for radio communication with one or more radio devices, e.g., functioning as a receiving UE.

Figure 8:
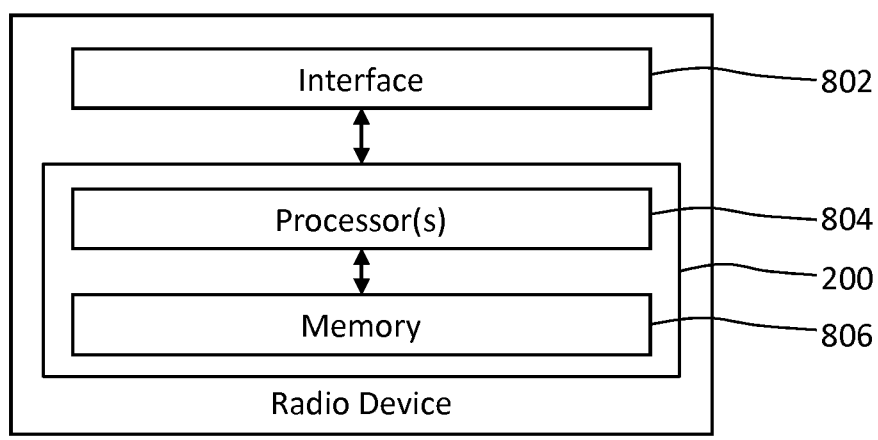
FIG. 8 shows an example schematic block diagram of a radio device embodying the device of FIG. 2.

FIG. 8 shows a schematic block diagram for an embodiment of the device 200. The device 200 comprises one or more processors 804 for performing the method 400 and memory 806 coupled to the processors 804. For example, the memory 806 may be encoded with instructions that implement at least one of the modules 202, 204, 206 and 208.

The one or more processors 804 may be a combination of one or more of a microprocessor, controller, microcontroller, central processing unit, digital signal processor, application specific integrated circuit, field programmable gate array, or any other suitable computing device, resource, or combination of hardware, microcode and/or encoded logic operable to provide, either alone or in conjunction with other components of the device 200, such as the memory 806, receiver functionality. For example, the one or more processors 804 may execute instructions stored in the memory 806. Such functionality may include providing various features and steps discussed herein, including any of the benefits disclosed herein. The expression "the device being operative to perform an action" may denote the device 200 being configured to perform the action.

As schematically illustrated in FIG. 8, the device 200 may be embodied by a radio device or UE 800, e.g., functioning as a receiving UE. The UE 800 comprises a radio interface 802 coupled to the device 200 for radio communication with one or more base stations, e.g., functioning as a transmitting base station.

Figure 9:
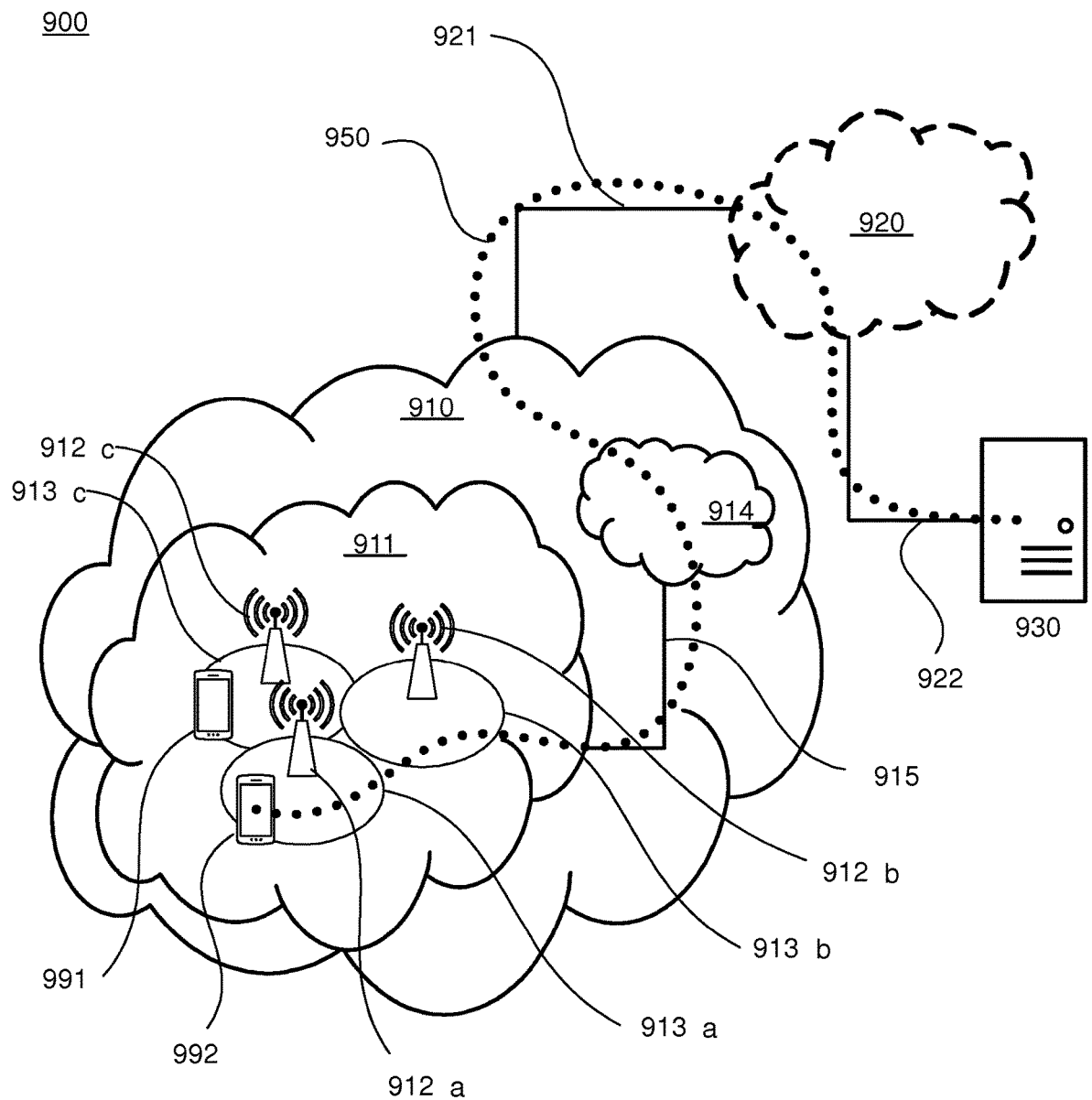
FIG. 9 schematically illustrates an example telecommunication network connected via an intermediate network to a host computer.

With reference to FIG. 9, in accordance with an embodiment, a communication system 900 includes a telecommunication network 910, such as a 3GPP-type cellular network, which comprises an access network 911, such as a radio access network, and a core network 914. The access network 911 comprises a plurality of base stations 912*a*, 912*b*, 912*c*, such as NBs, eNBs, gNBs or other types of wireless access points, each defining a corresponding coverage area 913*a*, 913*b*, 913*c*. Each base station 912*a*, 912*b*, 912*c* is connectable to the core network 914 over a wired or wireless connection 915. A first user equipment (UE) 991 located in coverage area 913*c* is configured to wirelessly connect to, or be paged by, the corresponding base station 912*c*. A second UE 992 in coverage area 913*a* is wirelessly connectable to the corresponding base station 912*a*. While a plurality of UEs 991, 992 are illustrated in this example, the disclosed embodiments are equally applicable to a situation where a sole UE is in the coverage area or where a sole UE is connecting to the corresponding base station 912.

The telecommunication network 910 is itself connected to a host computer 930, which may be embodied in the hardware and/or software of a standalone server, a cloud-implemented server, a distributed server or as processing resources in a server farm. The host computer 930 may be under the ownership or control of a service provider, or may be operated by the service provider or on behalf of the service provider. The connections 921, 922 between the telecommunication network 910 and the host computer 930 may extend directly from the core network 914 to the host computer 930 or may go via an optional intermediate network 920. The intermediate network 920 may be one of, or a combination of more than one of, a public, private or hosted network; the intermediate network 920, if any, may be a backbone network or the Internet; in particular, the intermediate network 920 may comprise two or more sub-networks (not shown).

The communication system 900 of FIG. 9 as a whole enables connectivity between one of the connected UEs 991, 992 and the host computer 930. The connectivity may be described as an over-the-top (OTT) connection 950. The host computer 930 and the connected UEs 991, 992 are configured to communicate data and/or signaling via the OTT connection 950, using the access network 911, the core network 914, any intermediate network 920 and possible further infrastructure (not shown) as intermediaries. The OTT connection 950 may be transparent in the sense that the participating communication devices through which the OTT connection 950 passes are unaware of routing of uplink and downlink communications. For example, a base station 912 need not be informed about the past routing of an incoming downlink communication with data originating from a host computer 930 to be forwarded (e.g., handed over) to a connected UE 991. Similarly, the base station 912 need not be aware of the future routing of an outgoing uplink communication originating from the UE 991 towards the host computer 930.

By virtue of the method 300 and 400 being performed by any one of the base stations 912 and/or any one of the UEs 991 or 992, the performance of the OTT connection 950 can be improved, e.g., in terms of increased throughput and/or reduced latency.

Example implementations, in accordance with an embodiment, of the UE, base station and host computer discussed in the preceding paragraphs will now be described with reference to FIG. 10. In a communication system 1000, a host computer 1010 comprises hardware 1015 including a communication interface 1016 configured to set up and maintain a wired or wireless connection with an interface of a different communication device of the communication system 1000. The host computer 1010 further comprises processing circuitry 1018, which may have storage and/or processing capabilities. In particular, the processing circuitry 1018 may comprise one or more programmable processors, application-specific integrated circuits, field programmable gate arrays or combinations of these (not shown) adapted to execute instructions. The host computer 1010 further comprises software 1011, which is stored in or accessible by the host computer 1010 and executable by the processing circuitry 1018. The software 1011 includes a host application 1012. The host application 1012 may be operable to provide a service to a remote user, such as a UE 1030 connecting via an OTT connection 1050 terminating at the UE 1030 and the host computer 1010. In providing the service to the remote user, the host application 1012 may provide user data, which is transmitted using the OTT connection 1050. The user data may depend on the location of the UE 1030. The user data may comprise auxiliary information or precision advertisements (also: ads) delivered to the UE 1030. The location may be reported by the UE 1030 to the host computer, e.g., using the OTT connection 1050, and/or by the base station 1020, e.g., using a connection 1060.

The communication system 1000 further includes a base station (BS) 1020 provided in a telecommunication system and comprising hardware 1025 enabling it to communicate with the host computer 1010 and with the UE 1030. The hardware 1025 may include a communication interface 1026 for setting up and maintaining a wired or wireless connection with an interface of a different communication device of the communication system 1000, as well as a radio interface 1027 for setting up and maintaining at least a wireless connection 1070 with a UE 1030 located in a coverage area (not shown in FIG. 10) served by the base station 1020. The communication interface 1026 may be configured to facilitate a connection 1060 to the host computer 1010. The connection 1060 may be direct or it may pass through a core network (not shown in FIG. 10) of the telecommunication system and/or through one or more intermediate networks outside the telecommunication system. In the embodiment shown, the hardware 1025 of the base station 1020 further includes processing circuitry 1028, which may comprise one or more programmable processors, application-specific integrated circuits, field programmable gate arrays or combinations of these (not shown) adapted to execute instructions. The base station 1020 further has software 1021 stored internally or accessible via an external connection.

The communication system 1000 further includes the UE 1030 already referred to. Its hardware 1035 may include a radio interface 1037 configured to set up and maintain a wireless connection 1070 with a base station serving a coverage area in which the UE 1030 is currently located. The hardware 1035 of the UE 1030 further includes processing circuitry 1038, which may comprise one or more programmable processors, application-specific integrated circuits, field programmable gate arrays or combinations of these (not shown) adapted to execute instructions. The UE 1030 further comprises software 1031, which is stored in or accessible by the UE 1030 and executable by the processing circuitry 1038. The software 1031 includes a client application 1032. The client application 1032 may be operable to provide a service to a human or non-human user via the UE 1030, with the support of the host computer 1010. In the host computer 1010, an executing host application 1012 may communicate with the executing client application 1032 via the OTT connection 1050 terminating at the UE 1030 and the host computer 1010. In providing the service to the user, the client application 1032 may receive request data from the host application 1012 and provide user data in response to the request data. The OTT connection 1050 may transfer both the request data and the user data. The client application 1032 may interact with the user to generate the user data that it provides.

Figure 10:
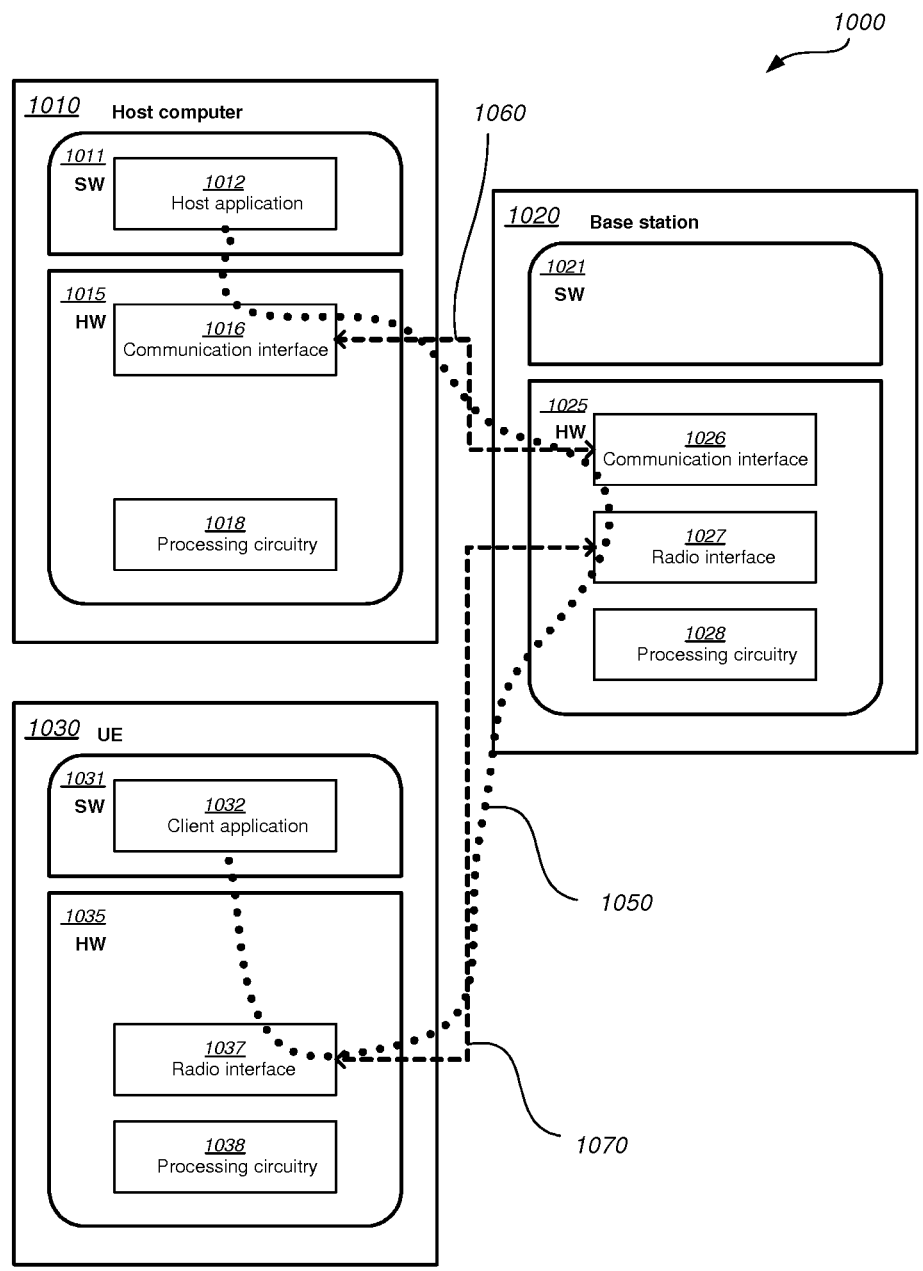
FIG. 10 shows a generalized block diagram of a host computer communicating via a base station or radio device functioning as a gateway with a user equipment over a partially wireless connection.

It is noted that the host computer 1010, base station 1020 and UE 1030 illustrated in FIG. 10 may be identical to the host computer 930, one of the base stations 912*a*, 912*b*, 912*c* and one of the UEs 991, 992 of FIG. 9, respectively. This is to say, the inner workings of these entities may be as shown in FIG. 10 and independently, the surrounding network topology may be that of FIG. 9.

In FIG. 10, the OTT connection 1050 has been drawn abstractly to illustrate the communication between the host computer 1010 and the use equipment 1030 via the base station 1020, without explicit reference to any intermediary devices and the precise routing of messages via these devices. Network infrastructure may determine the routing, which it may be configured to hide from the UE 1030 or from the service provider operating the host computer 1010, or both. While the OTT connection 1050 is active, the network infrastructure may further take decisions by which it dynamically changes the routing (e.g., on the basis of load balancing consideration or reconfiguration of the network).

The wireless connection 1070 between the UE 1030 and the base station 1020 is in accordance with the teachings of the embodiments described throughout this disclosure. One or more of the various embodiments improve the performance of OTT services provided to the UE 1030 using the OTT connection 1050, in which the wireless connection 1070 forms the last segment. More precisely, the teachings of these embodiments may reduce the latency and improve the data rate and thereby provide benefits such as better responsiveness.

A measurement procedure may be provided for the purpose of monitoring data rate, latency and other factors on which the one or more embodiments improve. There may further be an optional network functionality for reconfiguring the OTT connection 1050 between the host computer 1010 and UE 1030, in response to variations in the measurement results. The measurement procedure and/or the network functionality for reconfiguring the OTT connection 1050 may be implemented in the software 1011 of the host computer 1010 or in the software 1031 of the UE 1030, or both. In embodiments, sensors (not shown) may be deployed in or in association with communication devices through which the OTT connection 1050 passes; the sensors may participate in the measurement procedure by supplying values of the monitored quantities exemplified above, or supplying values of other physical quantities from which software 1011, 1031 may compute or estimate the monitored quantities. The reconfiguring of the OTT connection 1050 may include message format, retransmission settings, preferred routing etc.; the reconfiguring need not affect the base station 1020, and it may be unknown or imperceptible to the base station 1020. Such procedures and functionalities may be known and practiced in the art. In certain embodiments, measurements may involve proprietary UE signaling facilitating the host computer's 1010 measurements of throughput, propagation times, latency and the like. The measurements may be implemented in that the software 1011, 1031 causes messages to be transmitted, in particular empty or "dummy" messages, using the OTT connection 1050 while it monitors propagation times, errors etc.

Figures 11, 12:
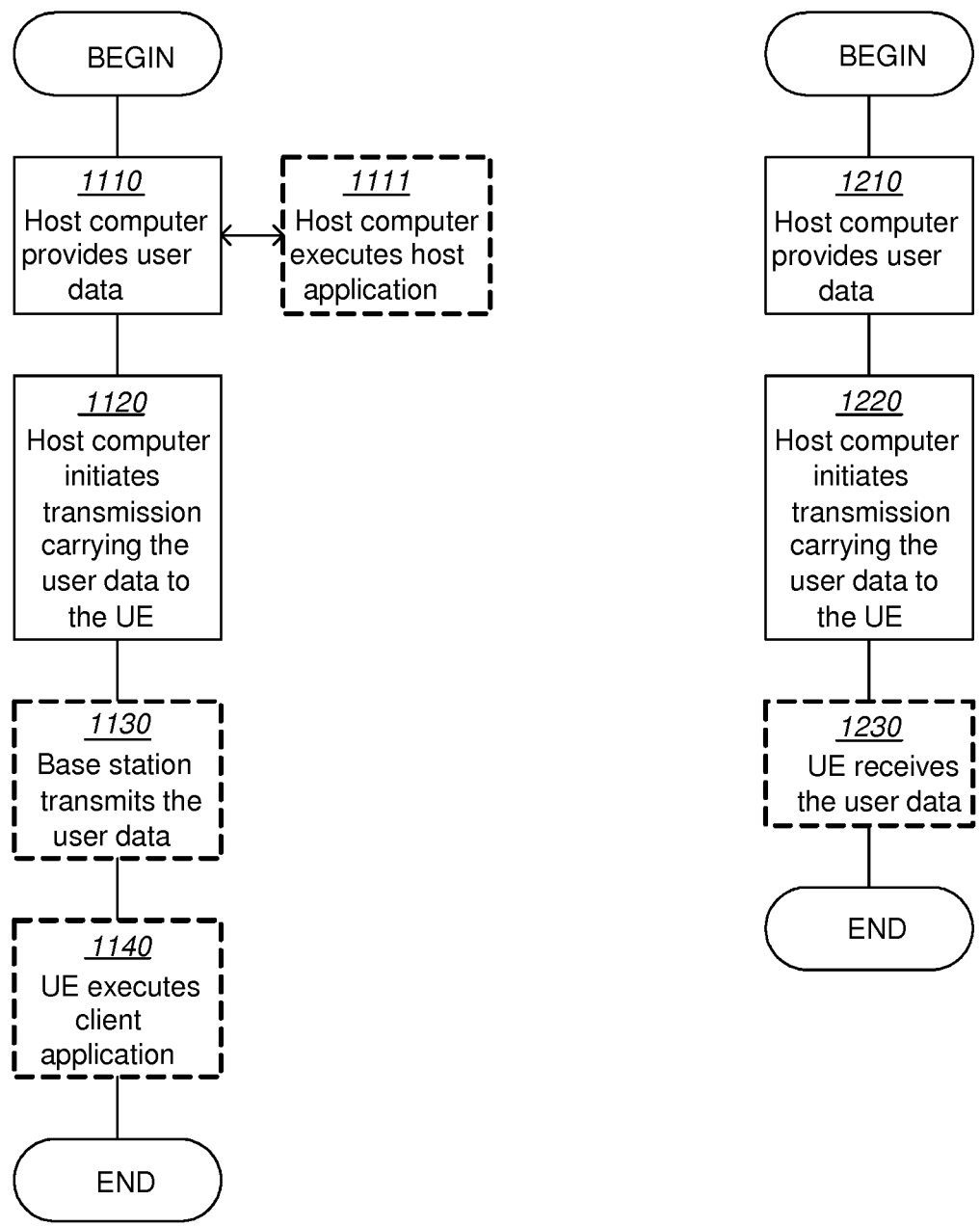
FIGS. 11 and 12 show flowcharts for methods implemented in a communication system including a host computer, a base station or radio device functioning as a gateway and a user equipment.

FIG. 11 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 11 will be included in this section. In a first step 1110 of the method, the host computer provides user data. In an optional substep 1111 of the first step 1110, the host computer provides the user data by executing a host application. In a second step 1120, the host computer initiates a transmission carrying the user data to the UE. In an optional third step 1130, the base station transmits to the UE the user data which was carried in the transmission that the host computer initiated, in accordance with the teachings of the embodiments described throughout this disclosure. In an optional fourth step 1140, the UE executes a client application associated with the host application executed by the host computer.

FIG. 12 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 12 will be included in this section. In a first step 1210 of the method, the host computer provides user data. In an optional substep (not shown) the host computer provides the user data by executing a host application. In a second step 1220, the host computer initiates a transmission carrying the user data to the UE. The transmission may pass via the base station, in accordance with the teachings of the embodiments described throughout this disclosure. In an optional third step 1230, the UE receives the user data carried in the transmission.

As has become apparent from above description, embodiments of the technique enable radio quality reporting. In particular, the downlink of a radio connection may still be used even if the uplink is out of coverage. The radio quality report may be transmitted using a higher layer aggregation with a different connection, e.g. using dual connectivity instead of CA or SUL.

The technique may be implemented without any modification to the supporting (e.g., secondary) connection. For example, the radio quality report may be transmitted using dual connectivity via a second BS. The second BS may be associated to a different, e.g. legacy, 3GPP standard and/or a different service provider than the first BS.

Many advantages of the present invention will be fully understood from the foregoing description, and it will be apparent that various changes may be made in the form, construction and arrangement of the units and devices without departing from the scope of the invention and/or without sacrificing all of its advantages. Since the invention can be varied in many ways, it will be recognized that the invention should be limited only by the scope of the following claims.

The invention claimed is:

1. A method for a first device to receive a radio quality report from a second device, the method comprising:
transmitting, to the second device, a first control message indicative of configuring the second device with reporting a radio quality report over a secondary connection that is different from a primary connection between the first device and the second device;
transmitting at least one reference signal (RS) to the second device over the primary connection;
receiving, from the second device over the secondary connection, the radio quality report that is indicative of a radio quality of the primary connection based on the at least one RS; and
based on the radio quality report, transmitting at least one of a second control message and data from the first device over the primary connection to the second device, wherein:
the transmission of at least one of the second control message and the data uses at least one of the following that is updated by the first device based on the received radio quality report: a beamforming configuration, and a modulation and coding scheme (MCS); and
one or more of the following applies:
the beamforming configuration is updated by the first device based on at least one of the following included in the radio quality report: a precoding matrix indicator (PMI), and a received rank indicator (RI); and
the MCS is updated by the first device based on a received channel quality information (CQI) included in the radio quality report,
wherein the first control message is indicative of:
a value of a first downlink radio quality threshold that triggers the second device to transmit the radio quality report over the secondary connection when a downlink radio quality of the primary connection at the second device is less than the indicated value of the first downlink radio quality threshold, and
a value of a second downlink radio quality threshold that triggers the second device to refrain from transmitting a radio quality report over the primary connection when the downlink radio quality of the primary connection is less than the indicated value of the second downlink radio quality threshold.

2. The method of claim 1, wherein at least one of the following applies:
at least one of the first control message and the second control message is transmitted using radio resource control (RRC) signaling; and
the first control message is transmitted over the primary connection.

3. The method of claim 1, wherein:
the at least one RS is generated at a first layer of a protocol stack;
the radio quality report is included in a protocol data unit (PDU) of a second layer of the protocol stack; and
the second layer is higher in the protocol stack than the first layer.

4. The method of claim 3, wherein:
the primary connection and the secondary connection are anchored at an anchoring layer of the protocol stack at the first device; and
one or more of the following applies:
the first layer is lower in the protocol stack than the anchoring layer, and
the second layer is equal to or higher in the protocol stack than the anchoring layer.

5. The method of claim 1, wherein the primary connection and the secondary connection are different in at least one of a spatial domain and a frequency domain.

6. The method of claim 1, wherein one of more of the following applies:
the first device comprises a first base station (BS) configured to provide radio access to one or more radio devices; and
the second device comprises a radio device configured for radio access to one or more base stations.

7. The method of claim 6, wherein the primary connection comprises a first radio connection of the radio device terminated at the first BS, and the secondary connection comprises a second radio connection of the radio device terminated at a second BS other than the first BS.

8. The method of claim 7, wherein:
the radio device is in dual connectivity with the first BS and the second BS on the primary connection and on the secondary connection, respectively; and
receiving the radio quality report at the first BS from the radio device comprises receiving the radio quality report forwarded from the second BS.

9. The method of claim 1, wherein the secondary connection comprises a data channel on which the radio quality report is received.

10. The method of claim 1, wherein the transmission of the at least one RS comprises beamforming transmissions of different RSs using different beamforming directions, respectively, and wherein the received radio quality report is indicative of the beamforming direction with the highest radio quality at the second device.

11. The method of claim 1, wherein the at least one RS comprises at least one of a channel state information reference signal (CSI-RS) and a synchronization signal block (SSB).

12. The method of claim 11, wherein the first control message is indicative of one of the following:
a subset of a set of SSBs transmitted from the first device; or
configuring the second device with autonomously detecting an SSB and reporting the radio quality of the detected SSB.

13. The method of claim 1, wherein the first control message is indicative of configuring the second device with to perform one of the following: periodically send radio quality reports, or send radio quality reports upon triggering by an event.

14. The method of claim 1, wherein the transmission of the configuration message to the second device is triggered by a failure of decoding uplink control information (UCI) from the second device.

15. The method of claim 1, wherein the first device estimates an uplink radio quality of the primary connection and performs or initiates the transmission of the configuration message to the second device when the uplink radio quality is less than a predefined or configured value of an uplink radio quality threshold.

16. The method of claim 1, wherein the first downlink radio quality threshold further triggers the second device to refrain from transmitting a radio quality report over the primary connection when the downlink radio quality of the primary connection is less than the indicated value of the first downlink radio quality threshold.

17. The method of claim 1, wherein
the value of the second downlink radio quality threshold is less than the value of the first downlink radio quality threshold.

18. A method for a second device to transmit a radio quality report to a first device, the method comprising:
receiving, from the first device, a first control message indicative of configuring the second device with reporting a radio quality report over a secondary connection that is different from a primary connection between the first device and the second device;
measuring, at the second device, a radio quality based on at least one reference signal (RS) received over the primary connection from the first device;
transmitting, to the first device over the secondary connection, the radio quality report that is indicative of the measured radio quality; and
receiving, based on the transmitted radio quality report, at least one of a second control message and data from the first device over the primary connection at the second device, wherein:
the transmission by the first device of at least one of the second control message and the data uses at least one of the following that is updated by the first device based on the transmitted radio quality report: a beamforming configuration, and a modulation and coding scheme (MCS); and
one or more of the following applies:
the beamforming configuration is updated by the first device based on at least one of the following included in the radio quality report: a precoding matrix indicator (PMI), and a received rank indicator (RI); and
the MCS is updated by the first device based on a received channel quality information (CQI) included in the radio quality report,
wherein the first control message is indicative of:
a value of a first downlink radio quality threshold that triggers the second device to transmit the radio quality report over the secondary connection when a downlink radio quality of the primary connection at the second device is less than the indicated value of the first downlink radio quality threshold, and
a value of a second downlink radio quality threshold that triggers the second device to refrain from transmitting a radio quality report over the primary connection when the downlink radio quality of the primary connection is less than the indicated value of the second downlink radio quality threshold.

* * * * *